US012707112B2

(12) United States Patent
Holden

(10) Patent No.: US 12,707,112 B2
(45) **Date of Patent: *Aug. 11, 2026**

(54) LINEAR INTERACTIVE TELEVISION DATA INSERTION

(71) Applicant: Comcast Cable Communications, LLC, Philadelphia, PA (US)

(72) Inventor: Danial E. Holden, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/975,385

(22) Filed: Dec. 10, 2024

(65) Prior Publication Data

US 2025/0106464 A1 Mar. 27, 2025

Related U.S. Application Data

(63) Continuation of application No. 12/834,484, filed on Jul. 12, 2010, now Pat. No. 12,301,919.

(51) Int. Cl.
*H04N 21/43* (2011.01)
*H04N 21/236* (2011.01)
(Continued)

(52) U.S. Cl.
CPC ... *H04N 21/4302* (2013.01); *H04N 21/23614* (2013.01); *H04N 21/23617* (2013.01);
(Continued)

(58) Field of Classification Search
CPC ....... H04N 21/23614; H04N 21/23617; H04N 21/242; H04N 21/4302; H04N 21/43074;
(Continued)

(56) References Cited

U.S. PATENT DOCUMENTS 6,111,896 A 8/2000 Slattery et al.
6,647,425 B1 11/2003 Chaddha
(Continued)

FOREIGN PATENT DOCUMENTS

EP 1487214 A1 12/2004
EP 1641212 A2 3/2006
(Continued)

OTHER PUBLICATIONS

Extended European Search Report in related European Application No. 11173413.3—dated Nov. 10, 2011.
(Continued)

*Primary Examiner* — Michael B. Pierorazio
(74) *Attorney, Agent, or Firm* — Banner & Witcoff, Ltd.

(57) ABSTRACT

A method and system is presented for utilizing an automation server and/or a traffic control manager in the content origination workflow to control a multiplexer, data carousel, and/or packager of an interactive television (iTV) system to synchronize the content (audio, video) with the interactive application data. Further, other aspects provide methods and systems for network ad insertion to generate iTV enhanced advertisements by placing a local ad splicer in the network to allow for splicing of both iTV enhanced advertisements and splicing of iTV applications into an MPEG-2 transport stream.

37 Claims, 5 Drawing Sheets

(51) Int. Cl.
*H04N 21/242* (2011.01)
*H04N 21/434* (2011.01)
*H04N 21/81* (2011.01)
*H04N 21/8545* (2011.01)

(52) U.S. Cl.
CPC ..... *H04N 21/242* (2013.01); *H04N 21/43074* (2020.08); *H04N 21/4348* (2013.01); *H04N 21/812* (2013.01); *H04N 21/8173* (2013.01); *H04N 21/8545* (2013.01)

(58) Field of Classification Search
CPC ............. H04N 21/4348; H04N 21/812; H04N 21/8173; H04N 21/8545
See application file for complete search history.

(56) References Cited

U.S. PATENT DOCUMENTS 7,069,575 B1 6/2006 Goode et al.
7,634,787 B1 12/2009 Gebhardt et al.
7,865,068 B2 * 1/2011 Van Gestel ........ H04N 21/4348 725/132
9,002,974 B1 4/2015 Dhanoa et al.
9,761,274 B2 * 9/2017 Delpuch ............ H04N 21/2387
12,301,919 B2 * 5/2025 Holden .............. H04N 21/8545
2001/0025377 A1 9/2001 Hinderks
2002/0129374 A1 9/2002 Freeman et al.
2003/0208768 A1 11/2003 Urdang et al.
2005/0204398 A1 9/2005 Ryal
2006/0222332 A1 * 10/2006 Van Gestel .......... G11B 27/034 348/E5.006
2007/0240076 A1 * 10/2007 Astala ................ G06F 16/9562 715/800
2008/0034392 A1 2/2008 McCarthy et al.
2009/0022165 A1 1/2009 Candelore et al.
2009/0150941 A1 * 6/2009 Riedl ............... H04N 21/47202 725/61
2009/0217326 A1 8/2009 Hasek
2009/0222871 A1 9/2009 Schaefer et al.
2009/0320063 A1 12/2009 Barrett
2011/0107379 A1 5/2011 Lajoie et al.
2011/0231484 A1 * 9/2011 Burgess, III ....... H04N 21/4782 709/203
2012/0304243 A1 * 11/2012 Li ........................ H04N 19/184 725/146
2014/0149918 A1 * 5/2014 Asokan ............. G06Q 30/0255 715/811
2016/0353159 A1 * 12/2016 Prabu ................. H04N 21/4383

FOREIGN PATENT DOCUMENTS

JP 2002366833 A 12/2002
KR 20060088439 A 8/2006
WO 0078043 A1 12/2000
WO 20050022916 A1 3/2005

OTHER PUBLICATIONS

European Office Action—App. 11173413.3—dated Mar. 15, 2017.
Randy Conrad: "Metadata Challenges for Today's TV Broadcast Systems": Oct. 20, 2009.
May 5, 2017—Canadian Office Action—CA 2,744,758.
May 11, 2018—Canadian Office Action—CA 2,744,758.
Apr. 12, 2019—Canadian Office Action—CA 2,744,758.
May 12, 2020—Canadian Office Action—CA 2,744,758.
Feb. 17, 2021—European Decision to Refuse—EP 11173413.3.
Jun. 7, 2021—Canadian Office Action—CA 2,744,758.
Jan. 10, 2023—CA Office Action—CA App. No. 2,744,758.

* cited by examiner

LINEAR INTERACTIVE TELEVISION DATA INSERTION

CROSS-REFERENCE TO RELATED APPLICATIONS

This application is a continuation of and claims priority to U.S. patent application Ser. No. 12/834,484, filed Jul. 12, 2010, which is hereby incorporated by reference in its entirety.

TECHNICAL FIELD

The disclosure relates generally to television content distribution networks. More specifically, the disclosure provides methods and systems for transmitting signals from a content origination source for inserting interactive television data into a transport stream.

BACKGROUND

In a content distribution system, audio, video, and data may be delivered using an MPEG-2 transport stream. The MPEG-2 transport stream is a communications protocol for audio, video, and data that forms a type of digital wrapper for encapsulating packetized elementary streams and other data. Within the MPEG-2 transport stream, each program stream may be given a specific program ID (PID) so that the receiver can select it out of the overall multiplexed stream.

Meanwhile, interactive television (iTV) allows viewers to interact with television content as they view it. These interactions may include the pressing or selecting of buttons, graphics, or other overlays to order, subscribe, or simply react to content and advertisements as they are displayed to the viewer. For a background example, the interactive television component may be defined as part of the enhanced TV binary exchange format (EBIF) or part of the OpenCable Application Platform (OCAP), now incorporated by the tru2way™ brand. Both EBIF and tru2way™ allow for the representation of an optimized collection of widget and byte code specifications that define one or more multimedia pages. These specifications define applications that integrate interactivity into the audiovisual content that is part of the transport stream. For instance, during the course of a streaming commercial marketing a particular product, an interactive application may run to allow customers to instantaneously purchase the product with the click of a button, overlay, or other graphic on the TV screen.

FIG. 1 shows an example of system 100 for generating MPEG-2 transport streams for distribution through a broadcast plant and eventually to customer premises equipment (e.g., a display device, gateway, set top box, etc.). Within FIG. 1, the traffic and billing system 101, automation system 105, and playback server 109 comprise the content origination system 127. The traffic and billing system 101 includes software for activities such as scheduling programs and advertisements through the generation of traffic schedules and logs 103, for informing potential advertisers about how much they will pay for advertising spots, and for keeping track of the revenue generated as a result of the sale of advertising spots. Based on the information in the traffic logs and schedules 103, the automation system 105 sends control signals 107 to the playback server 109 to stream the correct audio and video clips. The output of the playback server 109 that the automation system 105 controls is a serial digital interface (SDI) video 111.

The SDI video 111 is then run through an encoder 113. The encoder 113 compresses the video 111, converts it into a MPEG 2 program stream compressed video, and adds an MPEG-2 transport stream wrapper 115 around it. The audio and video stream 115 is then transmitted to a multiplexer 117, which adds additional data PIDs to the transport stream 115 and re-encodes the content to get to statistical multiplexing. The output of the multiplexer 117 is an MPEG-2 transport stream 119 with audio, video, and data PIDs.

In order to insert interactive television data into the MPEG-2 transport stream, the multiplexer 117 communicates with a digital storage media command and control (DSM-CC) carousel 121. The DSM-CC carousel 121 obtains data PIDs comprising interactive applications (e.g., EBIF, OCAP, and tru2way™ applications) and triggers (e.g., application information table (AIT) triggers for OCAP, enhanced television integrated signaling stream (EISS) triggers for EBIF, etc.) from a packager 123. The carousel 121 and the packager 123 comprise the iTV program enhancement module 125 of system 100. These data PIDs are spun on the DSM-CC carousel 121, converted into MPEG-2 transport streams, and eventually output to the multiplexer 117. The applications on the DSM-CC carousel may be spun continuously and there is currently a need to better control which applications are being tied to which piece of audio and/or video content. Currently, when a content provider wishes to provide an interactive application for a particular program within the transport stream, the provider may insert generic interactive data into all packets within the transport stream. Subsequently, a filter application is added to the transport stream to filter out data PIDs where they are not needed. This type of solution is cost prohibitive due to the hardware investment for redundancy and is not suited for national deployment.

Following insertion of the data PIDs for interactive content, the MPEG-2 transport stream 119 is transmitted through the content delivery system (e.g., a hybrid fiber coaxial system, satellite fiber optic, etc.) 129. Once the transport stream reaches the local destination zone (e.g., the correct zip code), advertisement information 135 may be locally added via a video splicing technique at the local advertisement insertion server 131 to the MPEG-2 transport stream, for example, in compliance with the Society of Cable Telecommunications Engineers (SCTE) specification. This advertisement information may include the advertisement spots (audio and video PIDs with the advertisements themselves) 135 along with iTV spot data 133. The information for scheduling the insertion of local advertisement information 131 may be managed by a local advertisement campaign management system 137.

The splicing of advertisements at the local zone (e.g., around a zip code, local provider's location etc.) does not allow advertisers to efficiently control their advertisement strategies at the national level because, for example, it requires the maintenance of many local advertisement management systems that act independently of one another, and an improvement is needed.

SUMMARY

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

To overcome limitations in the prior art described above, and to overcome other limitations that will be apparent upon reading and understanding the present specification. One aspect described herein provides a method and system for utilizing an automation system of content origination to control a multiplexer, data carousel, and/or packager of an interactive television (iTV) system to time synchronize the content (audio, video) with the interactive TV data.

Other aspects provide methods and systems for network ad insertion to generate iTV enhanced advertisements by placing a local ad splicer at the network to allow for splicing of both iTV enhanced advertisements and splicing of iTV applications into an MPEG-2 transport stream. Aspects described herein allow any network to enhance its content with interactive TV, e.g., deploying a local ad insertion system at network origination may be used at or by any network that is ad supported (e.g., Disney, CMC, NBC, ABC, SciFi, etc.).

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

Aspects described herein provide systems and methods for inserting interactive television (iTV) data into a transport stream for transmission to users of a content distribution network. As used herein, a content distribution network refers to any network through which data and/or content programming is provided to one or more consumers, e.g., via a wireless distribution network, fiber optic or coaxial network, satellite network, or the like.

Figure 1:
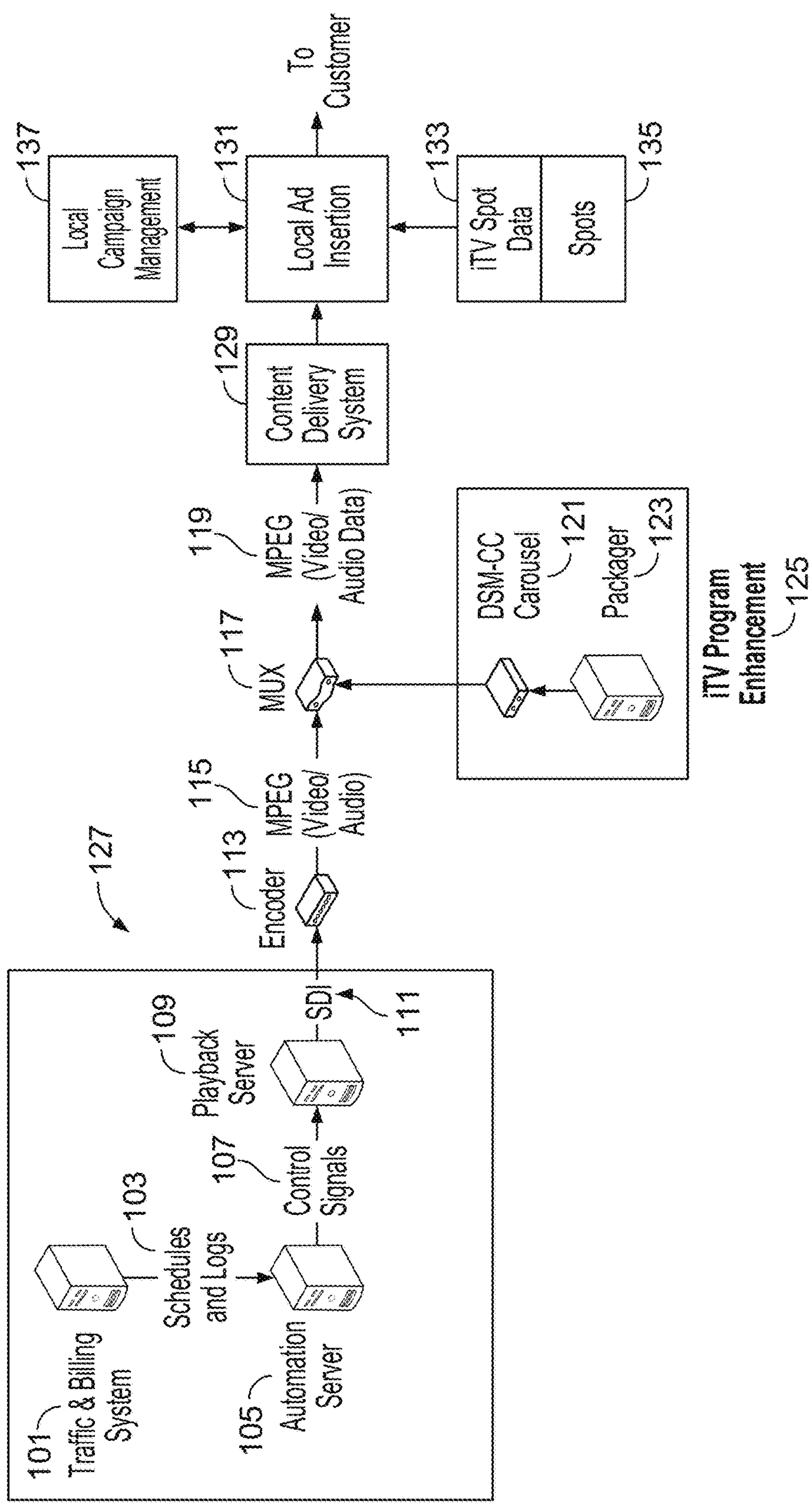
FIG. 1 illustrates a related system.
Figure 2:
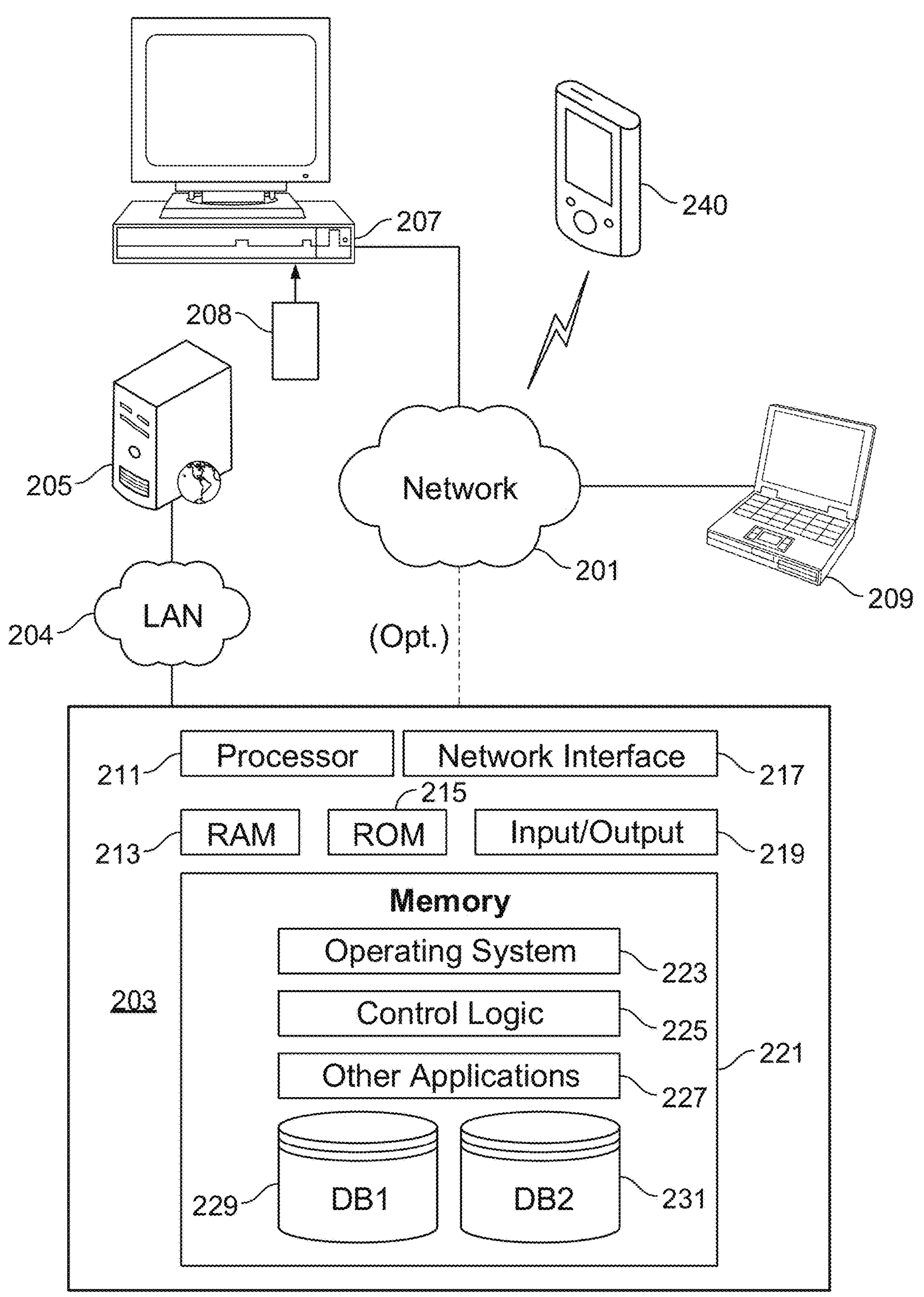
FIG. 2 illustrates a network with a data processing device that may be used to implement one or more illustrative aspects described herein.

FIG. 2 shows an exemplary network 201 (e.g., wide area network (WAN)) and data processing device 203 that may be used to implement one or more illustrative aspects described herein. Device 203 may be any type of known computer, server, gateway, decoder, set top box, router, switch, or other data processing device. For example, device 203 may comprise an automation server, traffic and billing system, playback server, content delivery system, and/or a multiplexer, among other things.

Device 203 may also include a processor 211 controlling overall operation of device 203. Device 203 may further include RAM 213, ROM 215, network interface 217, input/output interfaces 219 (e.g., keyboard, mouse, display, printer, etc.), and memory 221. I/O 219 may include a variety of interface units and drives for reading, writing, displaying, and/or printing data or files, as well as a camera (e.g., webcam), speaker, and/or microphone. Device 203 may use I/O 219 to communicate with other data processing devices 203 and/or peripherals including a television 207, laptop 209, desktop 205, and/or game console 240. Television 207 may include a remote control 208 for communicating with television 207. Communication with desktop 205 may occur via local access network (LAN) 204. For instance, a multimedia content delivery system as used herein may ultimately communicate with a television 207, laptop 209, desktop 205, and/or game console 240 with set top box type functionality at the customer site.

Memory 221 in device 203 may further store operating system software 223 for controlling overall operation of the data processing device 203, control logic 225 for instructing device 203 to perform aspects as described herein, and other application software 227 providing secondary, support, and/or other functionality which may or may not be used in conjunction with various aspects described herein. For instance, for a multimedia content distribution multiplexer, control logic 225 and/or other application software 227 may include logic designed to combine various elementary transport streams into a full MPEG-2 transport stream.

The control logic may also be referred to herein as the server software 225. Functionality of the server software may refer to operations or decisions made automatically based on rules coded into the control logic, made manually by a user providing input into the system, and/or a combination of automatic processing based on user input (e.g., queries, data updates, etc.).

Memory 221 may also store data used in performance of one or more aspects of the disclosure, including a first database 229 and a second database 231. In some embodiments, the first database may include the second database (e.g., as a separate table, report, etc.). That is, the information can be stored in a single database, or separated into different logical, virtual, or physical databases, depending on system design. For instance, for a playback server, databases 229 and/or 231 may include video and audio clips that need to be streamed based on instructions from an automation system.

Devices 205, 207, 209, and/or 240 may have a similar or different architecture as described with respect to device 203. The functionality of device 203 (or device 205, 207, 209, 240) as described herein may be spread across multiple data processing devices.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. For instance, control signals from the content origination system (automation server, traffic and/or billing system, etc.) may be embodied by computer-executable instructions transmitted from an I/O interface at the origination server to an I/O interface at a multiplexer, interactive data carousel, and/or interactive data packager.

The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Network 201 may comprise, for example, a wired or wireless network, a wide area network (WAN) 201, such as the Internet, a distribution network, fiber optic network, hybrid network, private intranets, corporate networks, LANs, wireless networks, personal networks (PAN), storage area networks (SAN), etc. Network 201 is for illustration purposes and may be replaced with fewer or additional networks. Device 203 may be connected to one or more of the networks via twisted pair wires, coaxial cable, fiber optics, wireless, infrared, or other communication or transmission media.

The term "network" as used herein and depicted in the drawings refers not only to systems in which remote devices are coupled together via one or more communication paths, but also to stand-alone devices that may be coupled, from time to time, to such systems that have storage capability. Consequently, the term "network" includes not only a "physical network" but also a "content network," which is comprised of the data which resides across all physical networks.

Figure 3:
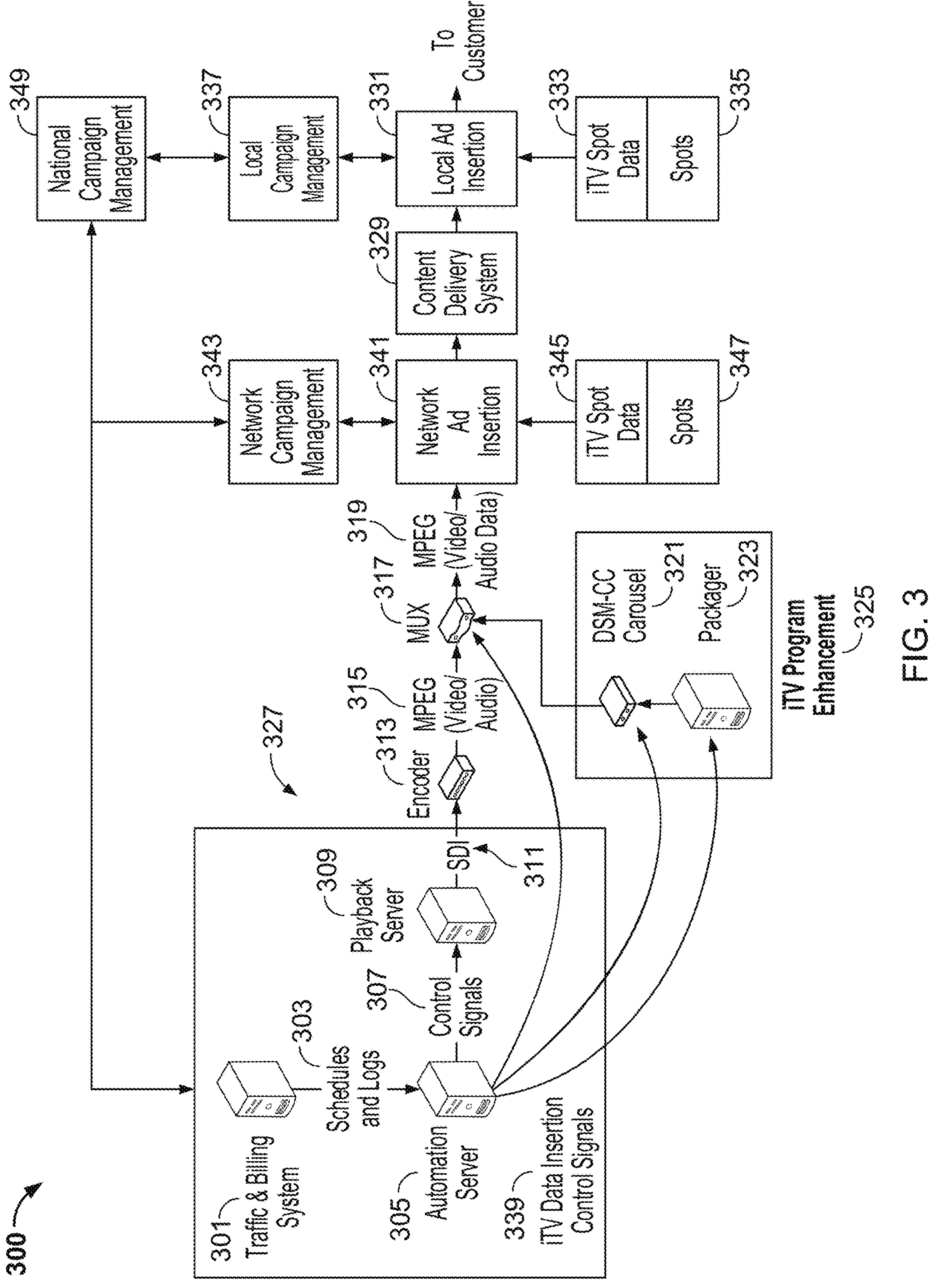
FIG. 3 illustrates a system in accordance with illustrative aspects of the disclosure.

FIG. 3 illustrates an exemplary content and/or advertisement origination and/or distribution system where interactive data may be inserted into both content and advertisements through upstream control signals carrying synchronization information in accordance with various aspects of the disclosure.

Within the system 300 of FIG. 3, the traffic and billing system 301, automation system 305, and playback server 309 may comprise the content origination system 327. The content origination system 327 may be used to create a linear signal or channel. The traffic and billing system 301 may include software for activities such as scheduling programs and advertisements through the generation of traffic schedules and logs 303, for informing potential advertisers about how much they will pay for advertising spots, and for keeping track of the revenue generated as a result of the sale of advertising spots.

The traffic and billing system 301 may be controlled by a traffic manager (not shown) located with or separately from the traffic and billing system 301. Similarly, the automation server 305 may be controlled by a master controller (not shown) located with or separately from the automation server 305. In certain embodiments, the traffic manager or master controller may override the traffic and billing system 301 and/or the automation server 305 to trigger streaming of certain content. For example, such a scenario may arise if the automation server 305 detects that certain content is missing from its video/audio libraries.

Based on the information in the traffic logs and schedules 303 of the traffic and billing system 301, the automation system 305 may send control signals 307 to the playback server 309 to stream the correct audio and video clips. The output of the playback server 309 may be a serial digital interface (SDI) video 311.

The SDI video 311 may then be run through an encoder 313. The encoder 313 may compress the video 311, convert it into a MPEG 2 program stream compressed video, and add an MPEG-2 transport stream wrapper 315 around it. The audio and video stream 315 may then be transmitted to a multiplexer 317, which may add additional data PIDs, including interactive application data PIDs, to the transport stream and may re-encode the content to get to statistical multiplexing. As a result, the output of the multiplexer 317 may be an MPEG-2 transport stream 319 with audio, video, and data PIDs. Although the disclosed embodiments are discussed relative to an MPEG-2 transport stream, this is exemplary only, and the disclosure is applicable to other known and future developed applicable transport streams.

The multiplexer 317 may communicate with a device such as a digital storage media command and control (DSM-CC) carousel 321 to receive the interactive data. The DSM-CC carousel 321 may obtain data PIDs comprising interactive applications (e.g., EBIF, OCAP, and tru2way™ applications) and triggers from a packager 323. Ultimately, the packager 323 may receive the interactive applications and/or triggers from a production or post-production facility for a particular program. In other embodiments, the packager 323 may receive the triggers/interactive applications from the traffic and billing system 301 and/or automation server 305.

The carousel 321 and the packager 323 may comprise the iTV program enhancement module 325 of system 300. The data PIDs associated with the interactive applications may be placed or spun on the DSM-CC carousel 121, converted into MPEG-2 transport streams, and eventually output to the multiplexer 317. Although embodiments are discussed relative to a carousel, other suitable devices or architectures may be utilized for placing or associating data onto the multiplexer or transport stream.

When viewed by a customer on a display device such as a television screen, the interactive applications may be represented in a number of ways. For example, the interactive application may represent voting/polling buttons or graphical overlays for television programs that allow customers to choose content from the program. In other examples, the interactive application may include an electronic program guide for choosing a particular program on a channel. In yet other embodiments, the interactive application may represent unrelated content such as a game and/or an interactive advertisement overlaid on a program.

According to an aspect of the disclosure, in order to insert interactive television data PIDs into the proper locations in the MPEG-2 transport stream, the multiplexer 317 may receive appropriate signals, such as control signals 339, from the automation server 305. For example, assume that a customer is viewing an interactive singing program in which viewers vote for their choice of best singer based on the viewed performances by each singer. If there are five different singers currently competing on the singing program, the control signals 339 may instruct the multiplexer to choose to insert the correct voting application for each contestant into the proper location in the MPEG-2 transport stream (e.g., when that contestant's performance is being displayed on the television screen).

In other embodiments, the automation server 305 may control the carousel 321 or the packager 323 to direct the triggering of interactive television data. In yet other embodiments, the iTV control signals 339 may be transmitted from the traffic and billing system to the multiplexer 317, data carousel 321, and/or the packager 323. In order to send control signals 339 from the automation server 305 and/or the traffic/billing system 301, an appropriate application programming interface (API) may need to be exposed on the multiplexer 317, carousel 321, and/or packager 323.

The control signals 339 may be sent in a variety of formats, including XML, HTML, among others. In addition, the control signals may include information about the triggers in formats such as AIT for the OCAP specification and/or EISS for the EBIF specification. Ultimately, the control signals may ensure that the proper EBIF and/or OCAP application and its associated AIT and/or EISS trigger is output from the multiplexer 317, carousel 321, and/or packager 323 for each interactive application in the MPEG-2 transport stream 319.

In some embodiments, the control signals 339 may originate in the traffic and billing system 301. System 301 may be modified in order to associate iTV application content in the system. Control signals 339 may then be passed to the automation system 305 via, for example, an ASCII file known as a traffic log 303. The traffic log 303 may then be ingested by the automation system 305 and converted to an automation log. Upon successful ingest of the automation log, the automation system 305 has the instructions for playing all audio/video segments and associated iTV applications and triggers. As such, with this instruction set, it is possible for the automation or master control system 305 to signal the playback server 309 to start an audio/video stream. With control signals 339, automation server 305 may also instruct a packager 323 to start or switch the application delivered to a DSM-CC carousel 321, instruct a DSM-CC carousel 321 to start or switch the application delivered to multiplexer 317, and/or instruct a multiplexer 317 to join or switch the application inserted into the transport stream 315.

In some embodiments, the automation system 305 may use general purpose interface (GPI) contact closures for messaging. This messaging format may be enhanced to support interfaces with web services. Automation system 305 may also support proprietary formats for traffic and automation logs 303. However, standardized communication interfaces such as SMPTE 2021 (Broadcast Exchange Format (BXF)) or other standards may also be used.

An alternative embodiment is to embed the applications and control signals 339 in a vertical blanking interval (VBI) and/or vertical ancillary (VANC). This type of solution may be modeled similarly to the solution detailed above, with the exception that data may be inserted directly into baseband video rather than the transport stream, and that a VANC inserter or encoder may be used for data insertion rather than a multiplexer 317.

If the iTV data control signals 339 are sent to the packager 323, the control signals 339 may control which interactive applications the packager 323 transmits to the carousel 321. Alternatively, if the control signals 339 are sent to the carousel 321, the packager 323 transmits all of the available interactive applications to the carousel 321, and the carousel 321 may select which streamed interactive applications are transmitted to the multiplexer 317. Finally, if the control signals 339 are sent directly to the multiplexer, all of the interactive applications are streamed to the multiplexer 317, and the multiplexer 317 may choose which of the interactive applications to insert into the MPEG-2 transport stream 315.

This technique allows data, audio and video content in the transport stream to be directly synchronized with interactive data by properly matching the video and audio PIDs with the data PIDs. As a result, errors in incorrect transmissions of audio/video programs with interactive applications may be minimized or all together eliminated.

According to another aspect of the disclosure, following insertion of the data PIDs for interactive content, the MPEG-2 transport stream may be transmitted to a network advertisement insertion server 341. The network advertisement insertion server 341 may then splice the MPEG-2 transport stream to insert advertisements 347 and appropriate interactive application data 345 into the transport stream based on information within the control signals 339. Alternatively, the interactive applications for the advertisements may have already been added to the transport stream at the multiplexer 317. A network campaign management system 343 may manage the network advertisement insertion server 341 and relay the proper advertisement data 347 to the network advertisement insertion server 341. Further, the network campaign management system 343 may communicate with the content origination system 327 and a national campaign management system 349 to distribute the proper advertisements at the appropriate places and times in the MPEG-2 transport stream.

After the advertisements have been inserted at the network, the MPEG-2 transport stream may be transmitted as before through a content delivery system (e.g., a hybrid fiber coaxial system, fiber, satellite, etc.) 329. Once the transport stream reaches the local destination zone (e.g., the correct zip code), new advertisement information may also be locally added at a local advertisement insertion server 331 again by splicing the MPEG-2 transport stream. This advertisement information may include the advertisement spots (audio ad video PIDs) 335 local to the region along with iTV spot data 333. The splicing of new local advertisements 335 into the MPEG-2 transport stream may strip out the network advertisements and associated application data inserted by the network advertisement insertion server 341. The information for scheduling the insertion of local advertisement information 331 may be managed by a local advertisement campaign management system 337 in communication with a national campaign management system 349. Ultimately, the modified MPEG-2 transport stream may be transmitted to a user within the network.

By incorporating a network advertisement insertion server 341, system 300 allows networks to coordinate the distribution of enhanced interactive advertisements directly from their sites or at a local controller. The interactive application data associated with the advertisements may be synchronized with the advertisement itself by a method similar to that discussed above for content.

Figure 4:
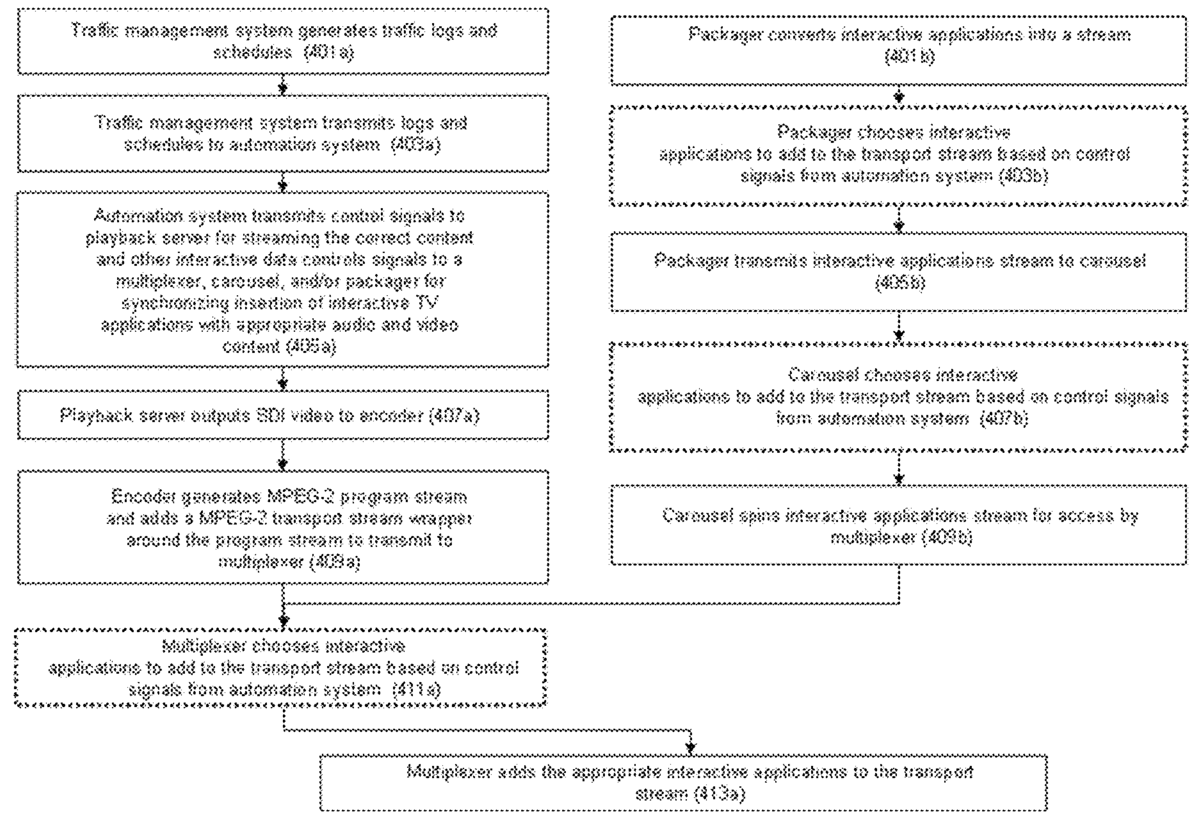
FIG. 4 illustrates a method in accordance with illustrative aspects of the disclosure.

FIG. 4 illustrates an exemplary method where interactive data may be inserted into content in accordance with various aspects of the disclosure. The method starts out at step 401*a* where a traffic management system 301 may generate traffic logs and schedules 303 for when audio, video, and/or data content need to be streamed. Then the traffic management system 301 may then transmit the logs and schedules 303 to an automation system 305 in step 403*a*.

Next, in step 405*a*, the automation system 305 may transmit control signals 307 to the playback server 309 for streaming the correct content to a customer. Here, the automation system 305 may also transmit interactive data control signals 339 to a multiplexer 317, carousel 321, and/or packager 323 for synchronizing the insertion of interactive TV applications (e.g., EBIF, OCAP, tru2way applications™) into an MPEG 2 transport stream with audio and video content.

In step 407*a*, the playback server 309 may receive the control signals 307 from the automation server 305 and stream the correct audio and video clips from its storage to create an SDI video stream 311. The SDI video stream 311 may then be transmitted to an encoder 313 which may generate an MPEG-2 program stream and add an MPEG-2 transport stream wrapper 315 around the program stream to transmit to the multiplexer 317 in step 409*a*.

Meanwhile, in a parallel process, a packager 323 may convert appropriate interactive applications into a stream in step 401*b*. If the automation system 305 transmits interactivity control signals 339 to the packager 323, the packager 323 then may use these control signals 339 to choose which interactive applications to relay to the carousel in step 403*b*. Since the automation system may send control signals 339 to the packager 323, carousel 321, and/or the multiplexer 317, step 403*b* is optional and is indicated as such by a dashed box around the step.

The process then may move to step 405*b* where the packager 323 transmits interactive applications (all or a chosen few based on control signals 339) to the carousel 321. If the automation system 305 transmits interactivity control signals 339 to the carousel 321, the carousel 321 then may use these control signals 339 to choose which interactive applications to add to the transport stream in step 407*b*. Again, since the automation system may send control signals 339 to the packager 323, carousel 321, and/or the multiplexer 317, step 407*b* is optional and is indicated as such by a dashed box around the step.

The process may then move to step 409*b* where the carousel 321 spins the interactive applications stream for access by a multiplexer 317 (again, all or a chosen few based on control signals 339). Next, in step 411*a*, if control signals 339 for interactive applications are only sent to the multiplexer 317, the multiplexer 317 may determine which interactive applications to add to the transport stream based on control signals from automation system 305. Again, since the automation system may send control signals 339 to the packager 323, carousel 321, and/or the multiplexer 317, step 411*a* is optional and is indicated as such by a dashed box around the step. Also, as mentioned above, in other embodiments, the control signals 339 may be transmitted by a traffic and billing system 301, the production facility (not shown), and/or a post-production facility (not shown), among others. Finally, in step 413*a*, the multiplexer 317 may add the appropriate interactive application data to the MPEG-2 transport stream 315 delivered from the encoder 313 to create a full MPEG-2 transport stream 319 with audio, video and interactive data.

Figure 5:
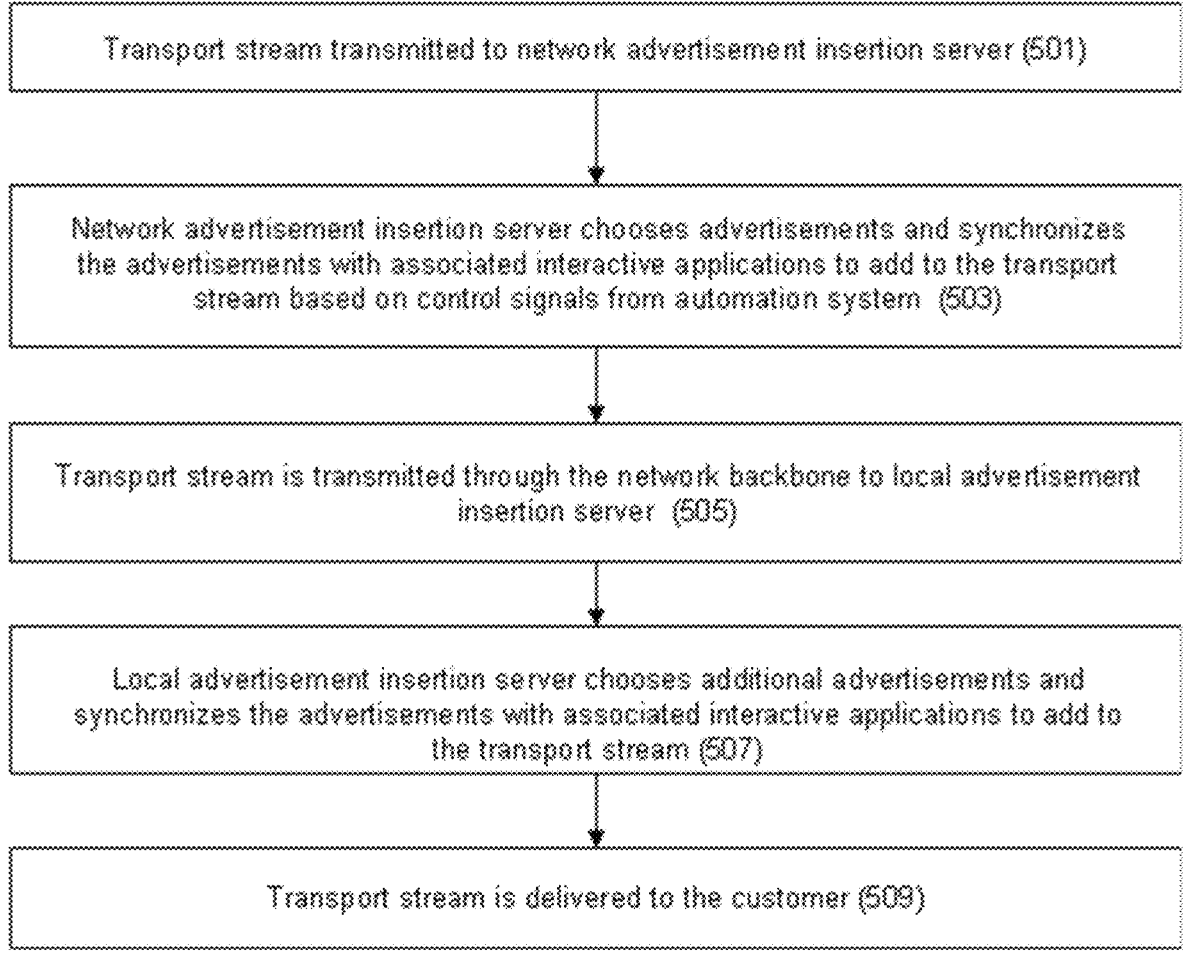
FIG. 5 illustrates a method in accordance with illustrative aspects of the disclosure.

FIG. 5 illustrates an exemplary method where advertisements and associated interactive data are inserted at the network through control signals carrying synchronization information from a content origination system in accordance with various aspects of the disclosure. The process begins at step 501 where the transport stream 319 with audio, video, and data is transmitted to or received at a network advertisement insertion server 341. Next, in step 503, the network advertisement insertion server 341 may choose advertisements 347 and synchronize the advertisements 347 with associated interactive advertisement data 345 to add to the transport stream 319 based on information in the control signals 339 from the automation system 305. The network advertisement insertion server 341 may be managed by a network campaign management system 343 which may coordinate advertisement 347 and associated interactive data 345 insertion activities with the content origination system 327 and a national campaign management system 349.

The process may then move to step 505 where the transport stream from the network advertisement insertion server 341 may be transmitted to or received by, for example, through a network backbone (hybrid fiber coaxial system, fiber, wireless, satellite, etc.) at a local advertisement insertion server 331. In step 507, the local advertisement insertion server may choose additional advertisements 335 and synchronize associated interactive applications 333 to add to the transport stream. Moreover, local advertisement insertion server 331 may be managed by a local advertisement campaign management server 337 in coordination with the national advertisement campaign management server 349. Finally, in step 509, the resulting MPEG-2 transport stream may be delivered to a customer.

In some embodiments, the role of master control includes acting as a single control plane for the generation of audio/video, lower thirds, bugs, closed captioning, etc. As discussed in the above specification, extending this model to support iTV may require interface extensions and supplemental functionality to existing equipment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing instructions that, when executed, cause:

receiving, by a computing device and from a remote server, a control signal associating different segments of a multimedia content item with different interactive applications to be output together with the multimedia content item;

receiving, by the computing device, a first stream comprising a plurality of video packets of the multimedia content item;

based on a determination that at least one video packet of the plurality of video packets comprises a first multimedia identifier corresponding to one of the different segments, retrieving an application packet for an associated interactive application from a data carousel comprising application packets of a plurality of interactive applications; and sending, to a first user device and for output via a second user device, a second stream comprising:

the at least one video packet; and the application packet.

2. The one or more non-transitory computer-readable media of claim 1, wherein the application packet comprises interactive application data formatted according to enhanced TV binary exchange format (EBIF), OpenCable Application Platform (OCAP), or TRU2WAY specification.

3. The one or more non-transitory computer-readable media of claim 1, wherein the data carousel makes the different interactive applications available in a repeating loop.

4. The one or more non-transitory computer-readable media of claim 1, wherein the instructions, when executed, cause the sending the second stream by sending the second stream to the first user device via a local advertisement insertion server.

5. The one or more non-transitory computer-readable media of claim 1, wherein the instructions, when executed, cause the sending the second stream by sending the second stream to the first user device via a network advertisement insertion server.

6. The one or more non-transitory computer-readable media of claim 1, wherein the data carousel comprises an MPEG-2 transport stream and wherein the instructions, when executed, cause the retrieving the application packet from the data carousel by retrieving the application packet from the MPEG-2 transport stream.

7. The one or more non-transitory computer-readable media of claim 1, wherein the first user device comprises a set top box, and wherein the second user device comprises a display device.

8. The one or more non-transitory computer-readable media of claim 1, wherein the instructions, when executed, further cause:

retrieving different application packets corresponding to different interactive applications for execution during different segments of the multimedia content item.

9. The one or more non-transitory computer-readable media of claim 1, wherein the application packet is synchronized for output with the at least one video packet.

10. The one or more non-transitory computer-readable media of claim 1, wherein the second stream further comprises a trigger associated with the application packet and wherein the trigger causes synchronization of the output of the application packet with the at least one video packet.

11. The one or more non-transitory computer-readable media of claim 1, wherein the control signal associates different multimedia identifiers for the different segments with different interactive application identifiers for the different interactive applications.

12. One or more non-transitory computer-readable media storing instructions that, when executed, cause:

receiving, by a computing device, a stream of a multimedia content item, wherein the multimedia content item comprises a plurality of segments;

receiving, from a remote server, a control signal associating different segments of the multimedia content item with different interactive applications to be output together with the multimedia content item;

receiving, from a data carousel that comprises software for a plurality of interactive applications and based on the control signal, a first interactive application, of the plurality of interactive applications, corresponding to a first segment of the plurality of segments;

receiving, from the data carousel and based on the control signal, a second interactive application, of the plurality of the interactive applications, corresponding to a second segment of the plurality of segments; and sending, by the computing device, to a first user device and for output via a second user device, an encoded stream comprising:

the multimedia content item;

the first interactive application; and the second interactive application.

13. The one or more non-transitory computer-readable media of claim 12, wherein the first interactive application comprises an application data identifier, and wherein the instructions, when executed, cause the receiving the first interactive application, of the plurality of interactive applications, corresponding to the first segment based on receiving the control signal associating the first segment with the application data identifier.

14. The one or more non-transitory computer-readable media of claim 12, wherein the data carousel makes the different interactive applications available in a repeating loop.

15. The one or more non-transitory computer-readable media of claim 12, wherein the data carousel comprises an MPEG-2 transport stream.

16. The one or more non-transitory computer-readable media of claim 12, wherein the first interactive application comprises a graphical overlay for the multimedia content item, wherein the instructions, when executed, further cause:

causing simultaneous display of the first interactive application with the first segment of the multimedia content item; and causing simultaneous display of the second interactive application with the second segment of the multimedia content item.

17. A system comprising:

a computing device; and a remote server, wherein the computing device is configured to:

receive, from the remote server, a control signal associating different segments of a multimedia content item with different interactive applications to be output together with the multimedia content item;

receive a first stream comprising a plurality of video packets of the multimedia content item;

based on a determination that at least one video packet of the plurality of video packets comprises a first multimedia identifier corresponding to one of the different segments, retrieve an application packet for an associated interactive application from a data carousel comprising application packets of a plurality of interactive applications; and send, to a first user device and for output via a second user device, a second stream comprising:

the at least one video packet; and the application packet, and wherein the remote server is configured to:

send the control signal.

18. The system of claim 17, wherein the application packet comprises interactive application data formatted according to enhanced TV binary exchange format (EBIF), OpenCable Application Platform (OCAP), or TRU2WAY specification.

19. The system of claim 17, wherein the data carousel makes the different interactive applications available in a repeating loop.

20. The system of claim 17, wherein the computing device is configured to send the second stream by sending the second stream to the first user device via a local advertisement insertion server.

21. The system of claim 17, wherein the computing device is configured to send the second stream by sending the second stream to the first user device via a network advertisement insertion server.

22. The system of claim 17, wherein the data carousel comprises an MPEG-2transport stream and wherein the computing device is configured to retrieve the application packet from the data carousel by retrieving the application packet from the MPEG-2 transport stream.

23. The system of claim 17, wherein the first user device comprises a set top box, and wherein the second user device comprises a display device.

24. The system of claim 17, wherein the computing device is further configured to:

retrieve different application packets corresponding to different interactive applications for execution during different segments of the multimedia content item.

25. The system of claim 17, wherein the application packet is synchronized for output with the at least one video packet.

26. The system of claim 17, wherein the second stream further comprises a trigger associated with the application packet and wherein the trigger causes synchronization of the output of the application packet with the at least one video packet.

27. The system of claim 17, wherein the control signal associates different multimedia identifiers for the different segments with different interactive application identifiers for the different interactive applications.

28. A system comprising:

a computing device; and a remote server, wherein the computing device is configured to:

receive, by the computing device, a stream of a multimedia content item, wherein the multimedia content item comprises a plurality of segments;

receive, from the remote server, a control signal associating different segments of the multimedia content item with different interactive applications to be output together with the multimedia content item;

receive, from a data carousel that comprises software for a plurality of interactive applications and based on the control signal, a first interactive application, of the plurality of interactive applications, corresponding to a first segment of the plurality of segments;

receive, from the data carousel and based on the control signal, a second interactive application, of the plurality of the interactive applications, corresponding to a second segment of the plurality of segments; and send, by the computing device, to a first user device and for output via a second user device, an encoded stream comprising:

the multimedia content item;

the first interactive application; and the second interactive application, and wherein the remote server is configured to:

send the control signal.

29. The system of claim 28, wherein the first interactive application comprises an application data identifier, and wherein the computing device is configured to receive the first interactive application, of the plurality of interactive applications, corresponding to the first segment based on receiving the control signal associating the first segment with the application data identifier.

30. The system of claim 28, wherein the data carousel makes the different interactive applications available in a repeating loop.

31. The system of claim 28, wherein the data carousel comprises an MPEG-2 transport stream.

32. The system of claim 28, wherein the first interactive application comprises a graphical overlay for the multimedia content item, wherein the computing device is further configured to:

cause simultaneous display of the first interactive application with the first segment of the multimedia content item; and cause simultaneous display of the second interactive application with the second segment of the multimedia content item.

33. A computing device comprising:

one or more processors; and memory storing instructions that, when executed by the one or more processors, cause the computing device to:

receive, by the computing device, a stream of a multimedia content item, wherein the multimedia content item comprises a plurality of segments;

receive, from a remote server, a control signal associating different segments of the multimedia content item with different interactive applications to be output together with the multimedia content item;

receive, from a data carousel that comprises software for a plurality of interactive applications and based on the control signal, a first interactive application, of the plurality of interactive applications, corresponding to a first segment of the plurality of segments;

receive, from the data carousel and based on the control signal, a second interactive application, of the plurality of the interactive applications, corresponding to a second segment of the plurality of segments; and send, by the computing device, to a first user device and for output via a second user device, an encoded stream comprising:

the multimedia content item;

the first interactive application; and the second interactive application.

34. The computing device of claim 33, wherein the first interactive application comprises an application data identifier, and wherein the instructions, when executed by the one or more processors, cause the computing device to receive the first interactive application, of the plurality of interactive applications, corresponding to the first segment based on receiving the control signal associating the first segment with the application data identifier.

35. The computing device of claim 33, wherein the data carousel makes the different interactive applications available in a repeating loop.

36. The computing device of claim 33, wherein the data carousel comprises an MPEG-2 transport stream.

37. The computing device of claim 33, wherein the first interactive application comprises a graphical overlay for the multimedia content item and wherein the instructions, when executed by the one or more processors, further cause the computing device to:

cause simultaneous display of the first interactive application with the first segment of the multimedia content item; and cause simultaneous display of the second interactive application with the second segment of the multimedia content item.

* * * * *